US012354547B2

(12) United States Patent
Lee et al.

(10) Patent No.: US 12,354,547 B2
(45) Date of Patent: Jul. 8, 2025

(54) PIXEL CIRCUIT AND DISPLAY DEVICE INCLUDING THE SAME

(71) Applicant: Samsung Display Co., LTD., Yongin-si (KR)

(72) Inventors: Jiyoung Lee, Yongin-si (KR); Hyunyoung Choi, Yongin-si (KR); Woogun Kang, Yongin-si (KR); Wonhyouk Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/434,863

(22) Filed: Feb. 7, 2024

(65) Prior Publication Data

US 2024/0274079 A1 Aug. 15, 2024

(30) Foreign Application Priority Data

Feb. 13, 2023 (KR) ........................ 10-2023-0018751

(51) Int. Cl.
*G09G 3/3233* (2016.01)
*G09G 3/20* (2006.01)

(52) U.S. Cl.
CPC ......... *G09G 3/3233* (2013.01); *G09G 3/2092* (2013.01); *G09G 2300/0819* (2013.01); *G09G 2300/0852* (2013.01); *G09G 2310/08* (2013.01); *G09G 2330/028* (2013.01)

(58) Field of Classification Search
None
See application file for complete search history.

(56) References Cited

U.S. PATENT DOCUMENTS

2014/0333686 A1* 11/2014 Kim .................... G09G 3/3233 345/82
2016/0379552 A1* 12/2016 Kim .................... G09G 3/3208 345/76

FOREIGN PATENT DOCUMENTS

KR 10-2017-0049778 5/2017
KR 10-2021-0146542 12/2021

* cited by examiner

*Primary Examiner* — Andre L Matthews
(74) *Attorney, Agent, or Firm* — KILE PARK REED & HOUTTEMAN PLLC

(57) ABSTRACT

A pixel circuit includes a driving transistor, a first capacitor including a first electrode and a second electrode, a write transistor that writes a data voltage to a control electrode of the driving transistor in response to a write gate signal, a first emission transistor that provides a first power supply voltage to the second electrode of the first capacitor in response to a first emission signal, a first initialization transistor that provides a first initialization voltage to the control electrode of the driving transistor in response to an initialization gate signal, a second initialization transistor that provides a second initialization voltage to a second electrode of the driving transistor in response to a bias gate signal, and a light emitting element that emits light.

14 Claims, 14 Drawing Sheets

PIXEL CIRCUIT AND DISPLAY DEVICE INCLUDING THE SAME

CROSS-REFERENCE TO RELATED APPLICATIONS

This application claims priority under 35 U.S.C. § 119 from Korean Patent Application No. 10-2023-0018751 filed on Feb. 13, 2023 in the Korean Intellectual Property Office (KIPO), the entire contents of which are incorporated herein by reference.

BACKGROUND

1. Technical Field

Embodiments of the disclosure relate to a pixel circuit capable of compensating for a threshold voltage of a driving transistor and a display device including the pixel circuit.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

The display devices may differ in characteristics such as a threshold voltage of a driving transistor for each pixel due to process variations and the like. Therefore, in order to improve display quality, the threshold voltage of the driving transistor may be compensated for in each pixel.

SUMMARY

An object of the disclosure is to provide a pixel circuit capable of compensating for a threshold voltage of a driving transistor by using capacitor coupling.

Another object of the disclosure is to provide a display device including the pixel circuit.

However, the object of the disclosure may not be limited thereto. Thus, the object of the disclosure may be extended without departing from the spirit and the scope of the disclosure.

According to embodiments, a pixel circuit may include a driving transistor configured to generate a driving current, a first capacitor including a first electrode and a second electrode, a write transistor configured to write a data voltage to a control electrode of the driving transistor in response to a write gate signal, a first emission transistor configured to provide a first power supply voltage to the second electrode of the first capacitor in response to a first emission signal, a first initialization transistor configured to provide a first initialization voltage to the control electrode of the driving transistor in response to an initialization gate signal, a second initialization transistor configured to provide a second initialization voltage to a second electrode of the driving transistor in response to a bias gate signal, and a light emitting element configured to receive the driving current to emit light.

In an embodiment, the pixel circuit may further include a second capacitor including a first electrode configured to receive the first power supply voltage and a second electrode electrically connected to the second electrode of the first capacitor, the first electrode of the first capacitor may be electrically connected to the control electrode of the driving transistor.

In an embodiment, the initialization gate signal and the bias gate signal may have activation periods in a first period, the write gate signal may have an activation period in a second period following the first period, and the first emission signal may have an activation period in a third period following the second period.

In an embodiment, the pixel circuit may further include a second emission transistor configured to electrically connect the first electrode of the driving transistor to the second electrode of the first capacitor in response to a second emission signal, the first electrode of the first capacitor may be electrically connected to the control electrode of the driving transistor.

In an embodiment, the pixel circuit may further include a third capacitor including a first electrode configured to receive the second emission signal and a second electrode electrically connected to the second electrode of the first capacitor.

In an embodiment, the initialization gate signal, the bias gate signal, and the second emission signal may have activation periods in a first period, the write gate signal may have an activation period in a second period following the first period, the first emission signal may have an activation period in a third period following the second period, and the first emission signal and the second emission signal may have activation periods in a fourth period following the third period.

In an embodiment, the pixel circuit may further include a second emission transistor configured to electrically connect the control electrode of the driving transistor to the first electrode of the first capacitor in response to the first emission signal.

In an embodiment, the pixel circuit may further include a third capacitor including a first electrode configured to receive the first power supply voltage and a second electrode connected to the control electrode of the driving transistor.

In an embodiment, the pixel circuit may further include a compensation reference transistor configured to provide the first power supply voltage to the first electrode of the first capacitor in response to the write gate signal.

In an embodiment, the initialization gate signal and the bias gate signal may have activation periods in a first period, the bias gate signal and the write gate signal may have activation periods in a second period following the first period, and the first emission signal may have an activation period in a third period following the second period.

In an embodiment, the first initialization voltage may be equal to the second initialization voltage.

According to embodiments, a display device may include a display panel including a pixel circuit, a gate driver configured to provide a write gate signal, an initialization gate signal, and a bias gate signal to the pixel circuit, an emission driver configured to provide a first emission signal to the pixel circuit, a data driver configured to provide a data voltage to the pixel circuit, and a timing controller configured to control the gate driver, the emission driver, and the data driver. Here, the pixel circuit may include a driving transistor configured to generate a driving current, a first capacitor including a first electrode and a second electrode, a write transistor configured to write the data voltage to the control electrode of the driving transistor in response to the write gate signal, a first emission transistor configured to provide a first power supply voltage to the second electrode of the first capacitor in response to the first emission signal, a first initialization transistor configured to provide a first initialization voltage to the control electrode of the driving transistor in response to the initialization gate signal, a second initialization transistor configured to provide a second initialization voltage to a second electrode of the driving transistor in response to the bias gate signal, and a light emitting element configured to receive the driving current to emit light.

In an embodiment, the pixel circuit may further include a second capacitor including a first electrode configured to receive the first power supply voltage and a second electrode electrically connected to the second electrode of the first capacitor, the first electrode of the first capacitor may be electrically connected to the control electrode of the driving transistor.

In an embodiment, the initialization gate signal and the bias gate signal may have activation periods in a first period, the write gate signal may have an activation period in a second period following the first period, and the first emission signal may have an activation period in a third period following the second period.

In an embodiment, the emission driver may be configured to further provide a second emission signal to the pixel circuit. In addition, the pixel circuit may further include a second emission transistor configured to electrically connect the first electrode of the driving transistor to the second electrode of the first capacitor in response to the second emission signal, the first electrode of the first capacitor may be electrically connected to the control electrode of the driving transistor.

In an embodiment, the pixel circuit may further include a third capacitor including a first electrode configured to receive the second emission signal and a second electrode electrically connected to the second electrode of the first capacitor.

In an embodiment, the initialization gate signal, the bias gate signal, and the second emission signal may have activation periods in a first period, the write gate signal may have an activation period in a second period following the first period, the first emission signal may have an activation period in a third period following the second period, and the first emission signal and the second emission signal may have activation periods in a fourth period following the third period.

In an embodiment, the pixel circuit may further include a second emission transistor configured to electrically connect the control electrode of the driving transistor to the first electrode of the first capacitor in response to the first emission signal.

In an embodiment, the pixel circuit may further include a third capacitor including a first electrode configured to receive the first power supply voltage and a second electrode connected to the control electrode of the driving transistor.

In an embodiment, the pixel circuit may further include a compensation reference transistor configured to provide the first power supply voltage to the first electrode of the first capacitor in response to the write gate signal.

Therefore, a pixel circuit according to embodiments may include a driving transistor configured to generate a driving current; a first capacitor including a first electrode and a second electrode; a write transistor configured to write a data voltage to a control electrode of the driving transistor in response to a write gate signal; a first emission transistor configured to provide a first power supply voltage to the second electrode of the first capacitor in response to a first emission signal; a first initialization transistor configured to provide a first initialization voltage to the control electrode of the driving transistor in response to an initialization gate signal; a second initialization transistor configured to provide a second initialization voltage to a second electrode of the driving transistor in response to a bias gate signal; and a light emitting element configured to receive the driving current to emit light, so that threshold voltage compensation using capacitor coupling can be performed with a small number of transistors.

In addition, a display device according to embodiments may include a pixel circuit capable of compensating for a threshold voltage of a driving transistor by using capacitor coupling, so that the display device can be advantageous for high-speed driving in terms of a compensation time as compared with a case where the driving transistor may be diode-connected to compensate for the threshold voltage.

However, the effect of the disclosure may not be limited thereto. Thus, the effect of the disclosure may be extended without departing from the spirit and the scope of the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
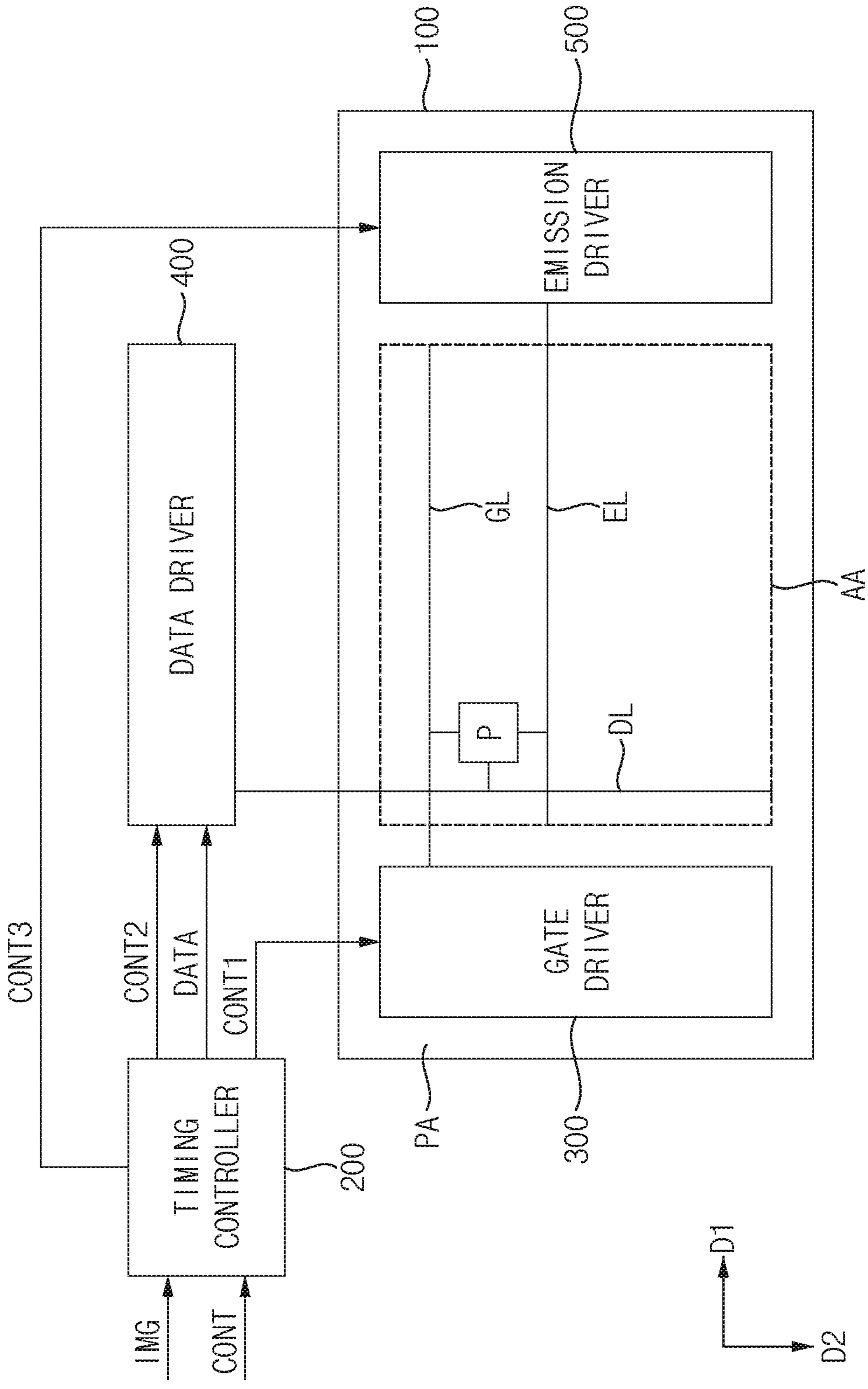
FIG. 1 is a schematic block diagram showing a display device according to embodiments of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing exemplary features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In case that an element, such as a layer, is referred to as being "on," "connected to," or "coupled to" another element or layer, it may be directly on, connected to, or coupled to the other element or layer or intervening elements or layers may be present. In case that, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may be different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," in case that used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Hereinafter, embodiments of the disclosure will be explained in detail with reference to the accompanying drawings.

FIG. 1 is a schematic block diagram showing a display device according to embodiments of the disclosure.

Referring to FIG. 1, a display device may include a display panel 100, a timing controller 200, a gate driver 300, a data driver 400, and an emission driver 500. According to one embodiment, the timing controller 200 and the data driver 400 may be integrated on one chip.

The display panel 100 may include a display part AA configured to display an image, and a peripheral part PA that may be adjacent to the display part AA. According to one embodiment, the gate driver 300 and the emission driver 500 may be mounted on the peripheral part PA.

The display panel 100 may include multiple gate lines GL, multiple data lines DL, multiple emission lines EL, and multiple pixel circuits P electrically connected to the gate lines GL, the data lines DL, and the emission lines EL. The gate lines GL and the emission lines EL may extend in a first direction D1, and the data lines DL may extend in a second direction D2 intersecting the first direction D1.

The timing controller 200 may receive input image data IMG and an input control signal CONT from a host processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT to output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. For example, the emission driver 500 may sequentially output the emission signals to the emission lines EL.

Figure 2:
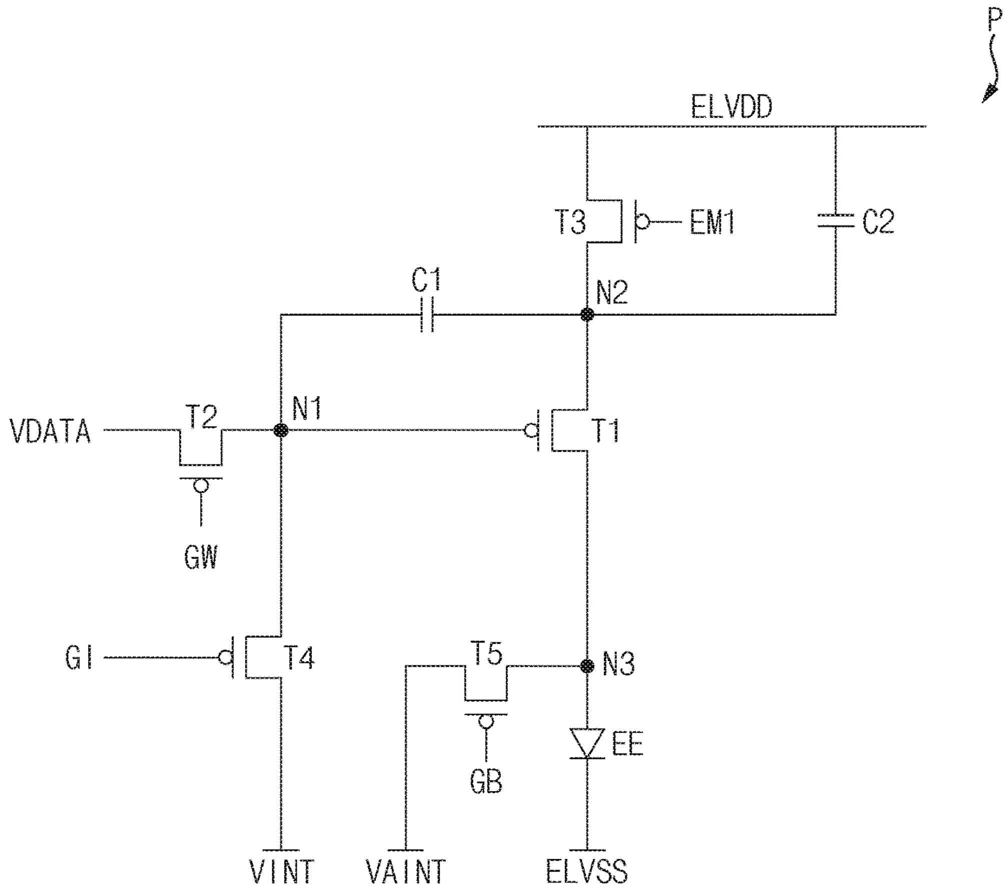
FIG. 2 is a schematic diagram of an equivalent circuit of a pixel circuit of the display device of FIG. 1.

FIG. 2 is a schematic diagram of an equivalent circuit of one example of a pixel circuit P of the display device of FIG. 1.

Referring to FIG. 2, the pixel circuit P may include a driving transistor T1 configured to generate a driving current; a first capacitor C1 including a first electrode electrically connected to a control electrode of the driving transistor T1, and a second electrode electrically connected to a first electrode of the driving transistor T1; a write transistor T2 configured to write a data voltage VDATA to the first capacitor C1 in response to a write gate signal GW; a first emission transistor T3 configured to provide a first power supply voltage ELVDD (e.g., a high power supply voltage) to the second electrode of the first capacitor C1 in response to a first emission signal EM1; a first initialization transistor T4 configured to provide a first initialization voltage VINT to the first electrode of the first capacitor C1 in response to an initialization gate signal GI; a second initialization transistor T5 configured to provide a second initialization voltage VAINT to a second electrode of the driving transistor T1 in response to a bias gate signal GB; and a light emitting element EE configured to receive the driving current to emit light. According to one embodiment, the pixel circuit P may further include a second capacitor C2 including a first electrode configured to receive the first power supply voltage ELVDD, and a second electrode electrically connected to the second electrode of the first capacitor C1.

For example, the driving transistor T1 may include a control electrode connected to the first node N1, a first electrode connected to the second node N2, and a second electrode connected to the third node N3. The write transistor T2 may include a control electrode configured to receive the write gate signal GW, a first electrode configured to receive the data voltage VDATA, and a second electrode connected to the first node N1. The first emission transistor T3 may include a control electrode configured to receive the first emission signal EM1, a first electrode configured to receive the first power supply voltage ELVDD, and a second electrode connected to the second node N2. The first initialization transistor T4 may include a control electrode configured to receive the initialization gate signal GI, a first electrode configured to receive the first initialization voltage VINT, and a second electrode connected to the first node N1. The second initialization transistor T5 may include a control electrode configured to receive the bias gate signal GB, a first electrode configured to receive the second initialization voltage VAINT, and a second electrode connected to the third node N3. The first capacitor C1 may include a first electrode connected to the first node N1, and a second electrode connected to the second node N2. The second capacitor C2 may include a first electrode configured to receive the first power supply voltage ELVDD, and a second electrode connected to the second node N2. The light emitting element EE may include a first electrode connected to the third node N3, and a second electrode configured to receive a second power supply voltage ELVSS (e.g., a low power supply voltage).

According to one embodiment, the first initialization voltage VINT may be equal to the second initialization voltage VAINT. According to one embodiment, the second initialization voltage VAINT may be equal to the second power supply voltage ELVSS.

The driving transistor T1, the write transistor T2, the first emission transistor T3, the first initialization transistor T4, and the second initialization transistor T5 may be implemented as p-channel metal oxide semiconductor (PMOS) transistors. A low voltage level (e.g., VL of FIG. 3) may be an activation level, and a high voltage level (e.g., VH of FIG. 3) may be an inactivation level. For example, in case that a signal applied to a control electrode of the PMOS transistor has the low voltage level, the PMOS transistor may be turned on. For example, in case that the signal applied to the control electrode of the PMOS transistor has the high voltage level, the PMOS transistor may be turned off. An activation period may be a period having an activation level where the transistor is turned on, and an inactivation period may be a period having an inactivation level where the transistor is turned off.

However, the disclosure may not be limited thereto. For example, the driving transistor T1, the write transistor T2, the first emission transistor T3, the first initialization transistor T4, and the second initialization transistor T5 may be implemented as n-channel metal oxide semiconductor (NMOS) transistors.

Figure 3:
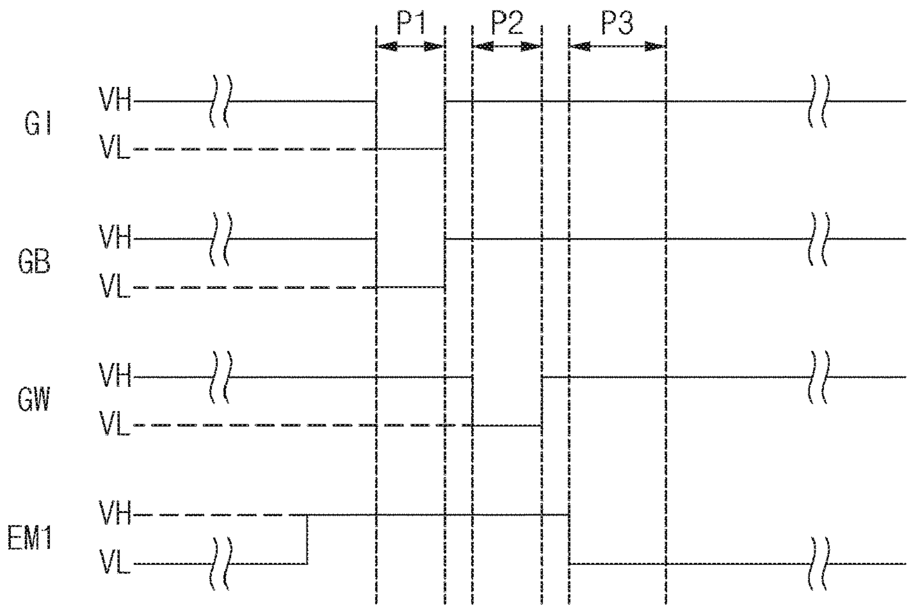
FIG. 3 is a schematic timing diagram showing one example of driving the pixel circuit of FIG. 2.

FIG. 3 is a schematic timing diagram showing one example of driving the pixel circuit P of FIG. 2.

Referring to FIGS. 2 and 3, in a first period P1, the initialization gate signal GI and the bias gate signal GB may have activation periods, and the write gate signal GW and the first emission signal EM1 may have inactivation periods. Accordingly, the first initialization transistor T4 and the second initialization transistor T5 may be turned on, the first initialization voltage VINT may be applied to the first node N1, and the second initialization voltage VAINT may be applied to the third node N3. Therefore, a voltage of the first node N1 may be VINT, and a voltage of the second node N2 may be VAINT−VTH, where VINT may be the first initialization voltage, VAINT may be the second initialization voltage, and VTH may be a threshold voltage of the driving transistor T1.

In a second period P2 following the first period P1, the write gate signal GW may have an activation period, and the initialization gate signal GI, the bias gate signal GB, and the first emission signal EM1 may have inactivation periods. Accordingly, the write transistor T2 may be turned on, and the data voltage VDATA may be applied to the first node N1. In addition, the voltage of the second node N2 may be increased by (C_C1/(C_C1+C_C2))*(VDATA−VINT) according to coupling of the first capacitor C1. Therefore, the voltage of the first node N1 may be VDATA, and the voltage of the second node N2 may be VAINT−VTH+(C_C1/(C_C1+C_C2))*(VDATA−VINT), where VDATA may be the data voltage, VAINT may be the second initialization voltage, VTH may be the threshold voltage of the driving transistor T1, C_C1 may be a capacitance of the first capacitor C1, and C_C2 may be a capacitance of the second capacitor C2.

In a third period P3 following the second period P2, the first emission signal EM1 may have an activation period, and the initialization gate signal GI, the bias gate signal GB, and the write gate signal GW may have inactivation periods. Accordingly, the first emission transistor T3 may be turned on, and the first power supply voltage ELVDD may be applied to the second node N2. In addition, the voltage of the first node N1 may be increased by ELVDD−(VAINT−VTH+(C_C1/(C_C1+C_C2))*(VDATA−VINT)) according to the coupling of the first capacitor C1. Therefore, the voltage of the first node N1 may be VDATA+ELVDD−(VAINT−VTH+(C_C1/(C_C1+C_C2))*(VDATA−VINT)), and the voltage of the second node N2 may be ELVDD, where VDATA may be the data voltage, ELVDD may be the first power supply voltage, VAINT may be the second initialization voltage, VTH may be the threshold voltage of the driving transistor T1, C_C1 may be the capacitance of the first capacitor C1, and C_C2 may be the capacitance of the second capacitor C2.

In the third period P3 where the light emitting element EE emits the light, the driving transistor T1 may generate the driving current corresponding to a gate-source voltage, and the gate-source voltage may be VDATA−(VAINT−VTH+(C_C1/(C_C1+C_C2))*(VDATA−VINT)). Since the gate-source voltage of the driving transistor T1 includes a data voltage component and a threshold voltage component, the driving current may include the data voltage component without including the threshold voltage component. In other words, the threshold voltage of the driving transistor T1 may be compensated for.

Figure 4:
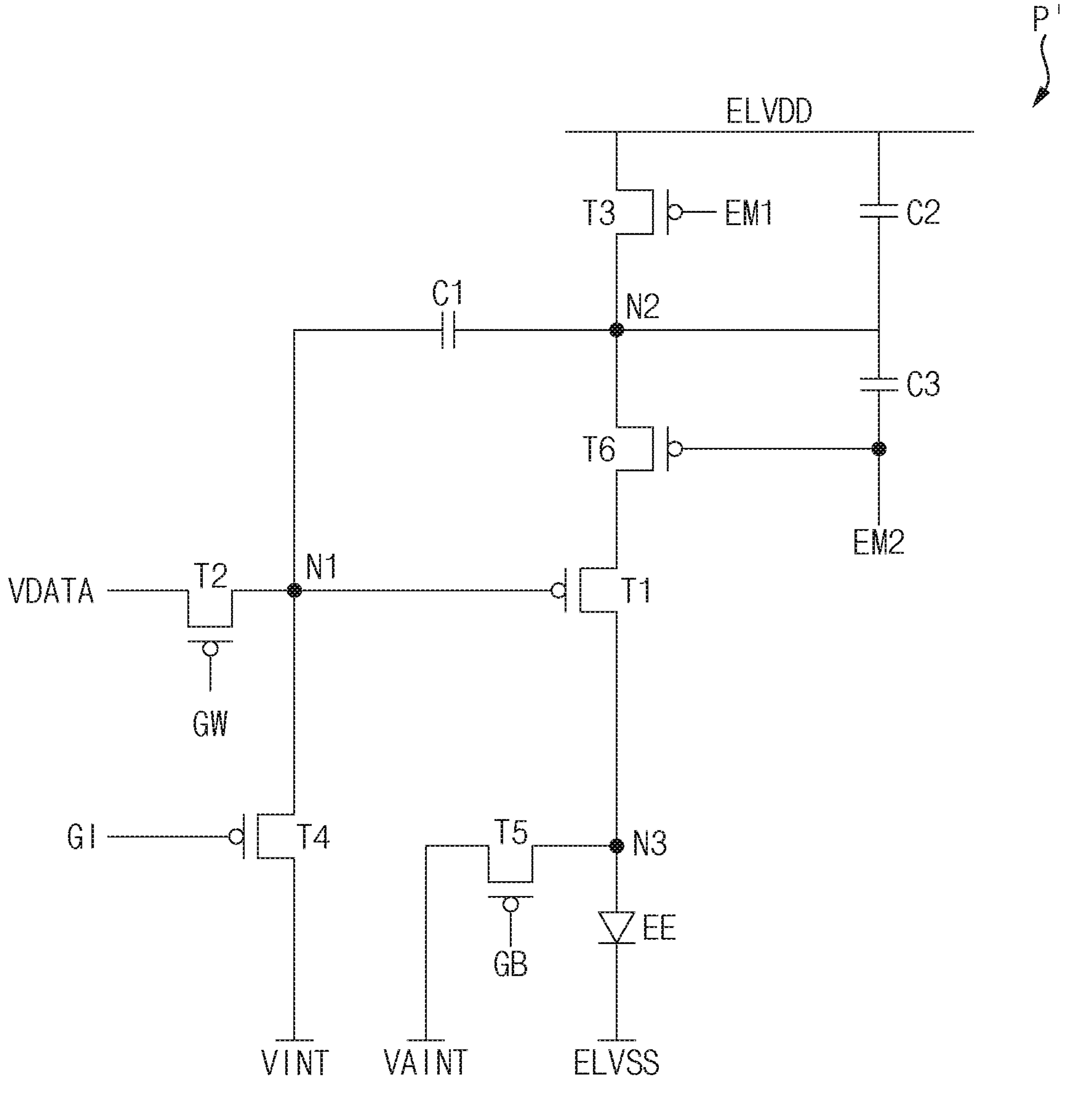
FIG. 4 is a schematic diagram of an equivalent circuit of a pixel according to embodiments of the disclosure.

FIG. 4 is a schematic diagram of an equivalent circuit P' of a pixel according to embodiments of the disclosure.

Referring to FIG. 4, a pixel circuit P' may include a driving transistor T1 configured to generate a driving current; a first capacitor C1 including a first electrode electrically connected to a control electrode of the driving transistor T1, and a second electrode electrically connected second node N2, the second electrode of first capacitor C1 may also be electrically connected to a first electrode of the driving transistor T1 by way of second emission transistor T6 upon the second emission transistor T6 being activated; a write transistor T2 configured to write a data voltage VDATA to the first capacitor C1 in response to a write gate signal GW; a first emission transistor T3 configured to provide a first power supply voltage ELVDD to the second electrode of the first capacitor C1 in response to a first emission signal EM1; a first initialization transistor T4 configured to provide a first initialization voltage VINT to the first electrode of the first capacitor C1 in response to an initialization gate signal GI; a second initialization transistor T5 configured to provide a second initialization voltage VAINT to a second electrode of the driving transistor T1 in response to a bias gate signal GB; and a light emitting element EE configured to receive the driving current to emit light. According to one embodiment, the pixel circuit P' may further include a second capacitor C2 including a first electrode configured to receive the first power supply voltage ELVDD, and a second electrode electrically connected to the second electrode of the first capacitor C1.

According to one embodiment, the pixel circuit P' may include a second emission transistor T6 configured to electrically connect the first electrode of the driving transistor T1 to the second electrode of the first capacitor C1 in response to a second emission signal EM2. According to one embodiment, the pixel circuit P' may include a third capacitor C3 including a first electrode configured to receive the second emission signal EM2, and a second electrode electrically connected to the second electrode of the first capacitor C1.

For example, the driving transistor T1 may include a control electrode connected to the first node N1, a first electrode connected to the second electrode of a second emission transistor T6, and a second electrode connected to the third node N3. The write transistor T2 may include a control electrode configured to receive the write gate signal GW, a first electrode configured to receive the data voltage VDATA, and a second electrode connected to the first node N1. The first emission transistor T3 may include a control electrode configured to receive the first emission signal EM1, a first electrode configured to receive the first power supply voltage ELVDD, and a second electrode connected to the second node N2. The first initialization transistor T4 may include a control electrode configured to receive the initialization gate signal GI, a first electrode configured to receive the first initialization voltage VINT, and a second electrode connected to the first node N1. The second initialization transistor T5 may include a control electrode configured to receive the bias gate signal GB, a first electrode configured to receive the second initialization voltage, and a second electrode connected to the third node N3. The first capacitor C1 may include a first electrode connected to the first node N1, and a second electrode connected to the second node N2. The second capacitor C2 may include a first electrode configured to receive the first power supply voltage ELVDD, and a second electrode connected to the second node N2. The light emitting element EE may include a first electrode connected to the third node N3, and a second electrode configured to receive a second power supply voltage ELVSS. The second emission transistor T6 may include a control electrode configured to receive the second emission signal EM2, a first electrode connected to the second node N2, and a second electrode connected to the first electrode of the driving transistor T1. The third capacitor C3 may include a first electrode configured to receive the second emission signal EM2, and a second electrode connected to the second node N2.

According to one embodiment, the first initialization voltage VINT may be equal to the second initialization voltage VAINT. According to one embodiment, the second initialization voltage VAINT may be equal to the second power supply voltage ELVSS.

The driving transistor T1, the write transistor T2, the first emission transistor T3, the first initialization transistor T4, the second initialization transistor T5, and the second emission transistor T6 may be implemented as PMOS transistors. A low voltage level may be an activation level, and a high voltage level may be an inactivation level. For example, in case that a signal applied to a control electrode of the PMOS transistor has the low voltage level, the PMOS transistor may be turned on. For example, in case that the signal applied to the control electrode of the PMOS transistor has the high voltage level, the PMOS transistor may be turned off.

However, the disclosure may not be limited thereto. For example, the driving transistor T1, the write transistor T2, the first emission transistor T3, the first initialization transistor T4, the second initialization transistor T5, and the second emission transistor T6 may be implemented as NMOS transistors.

Figure 5:
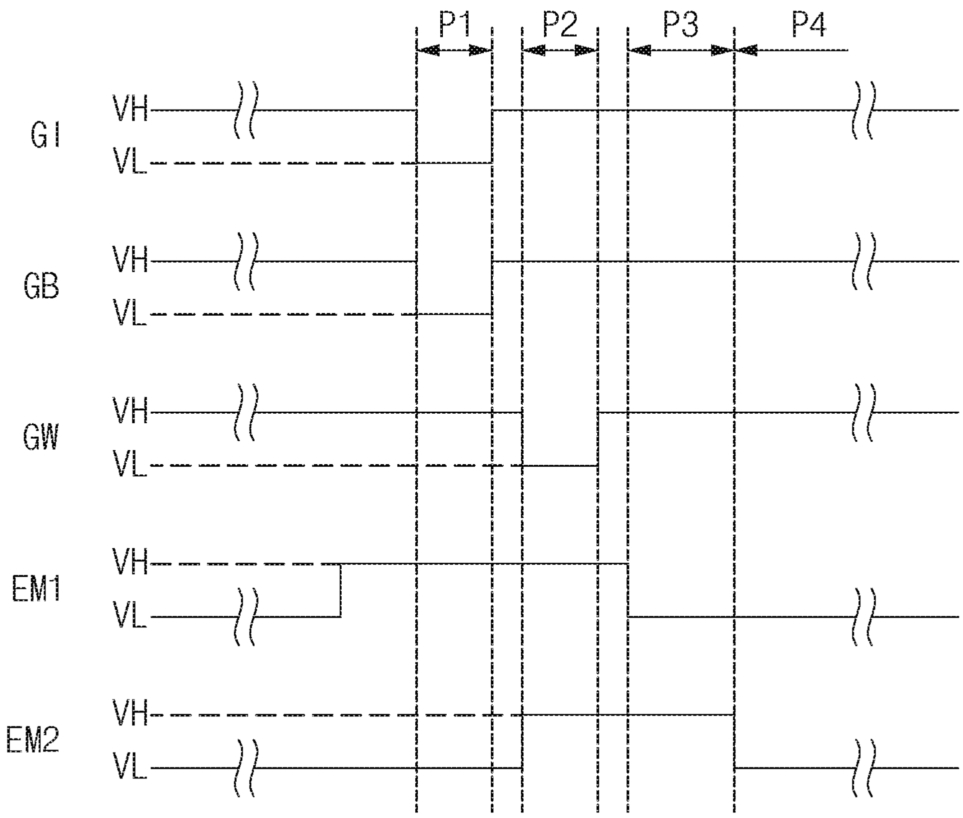
FIG. 5 is a schematic timing diagram showing one example of driving the pixel circuit of FIG. 4.
Figure 6:
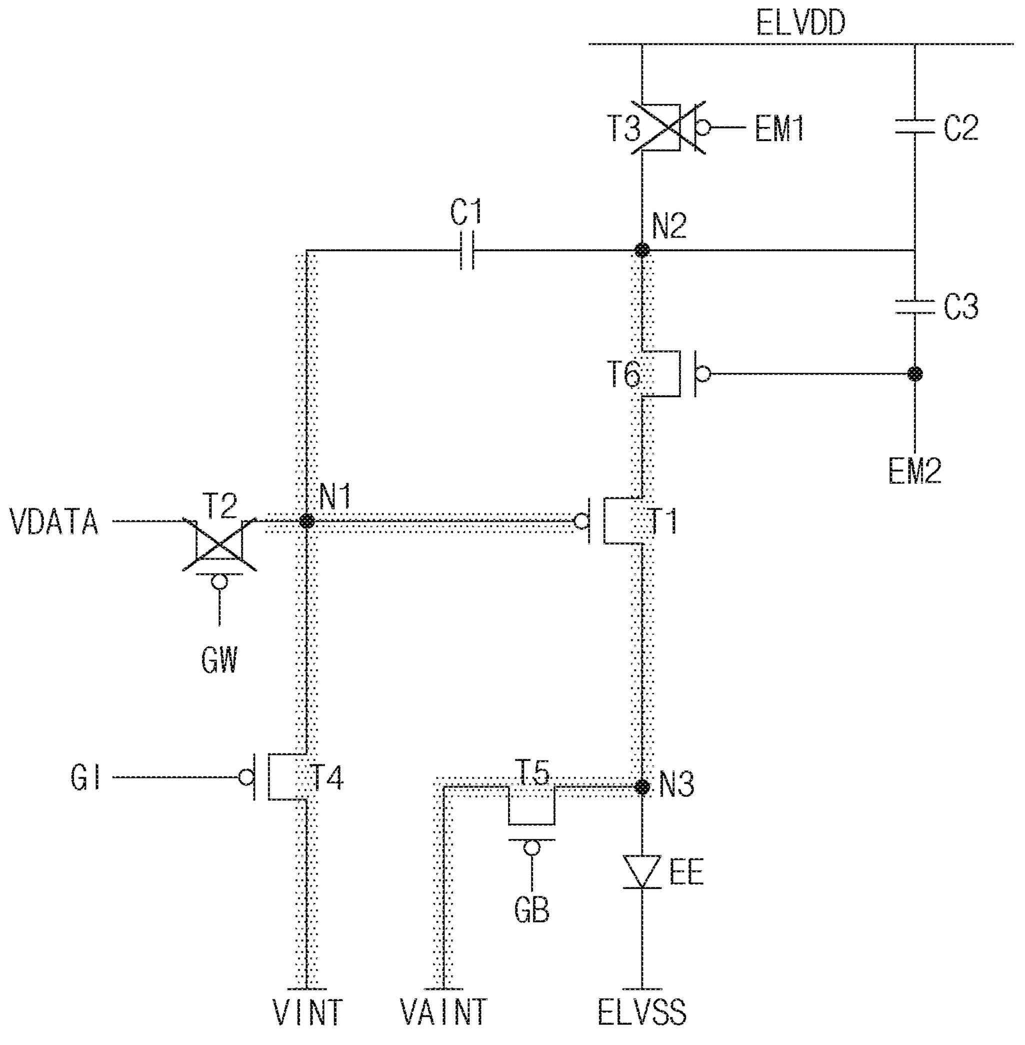
FIG. 6 is a schematic diagram showing one example of driving the pixel circuit of FIG. 4 in a first period.
Figure 7:
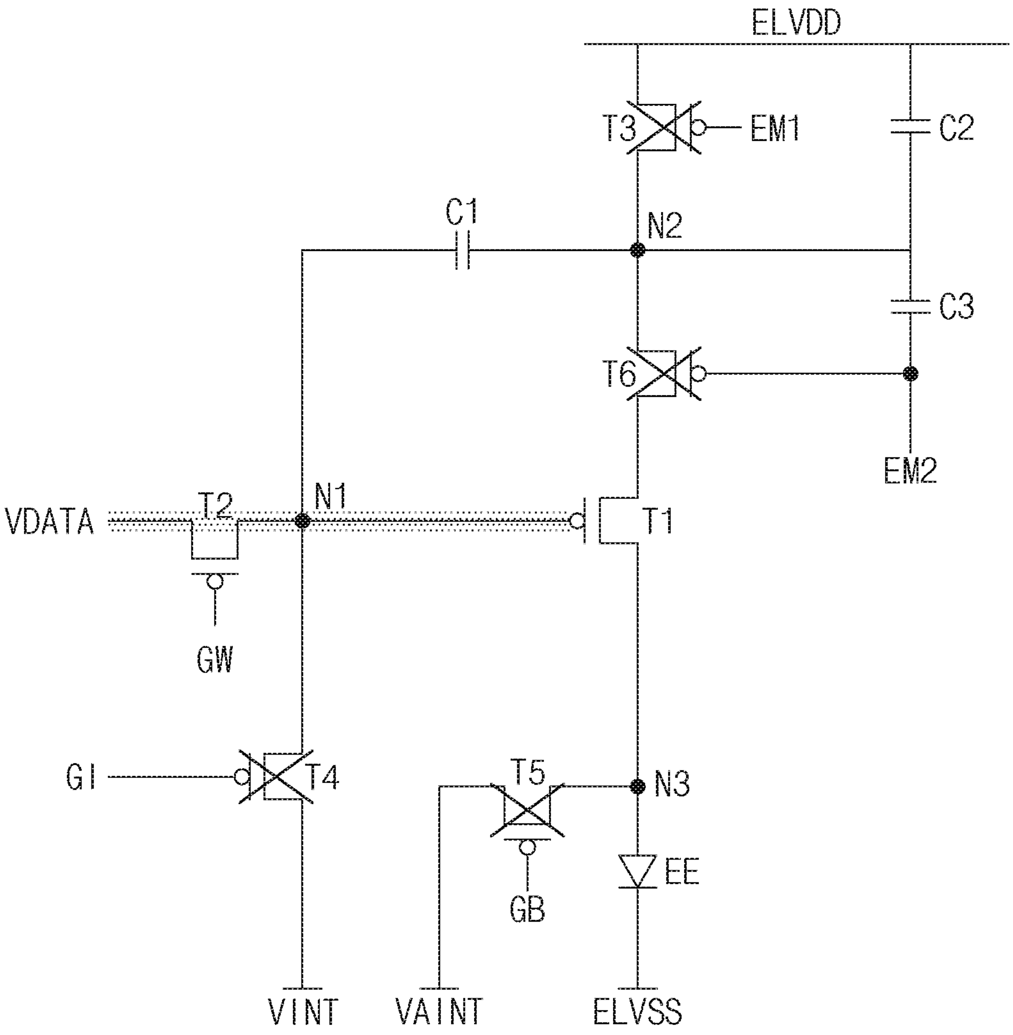
FIG. 7 is a schematic diagram showing one example of driving the pixel circuit of FIG. 4 in a second period.
Figure 8:
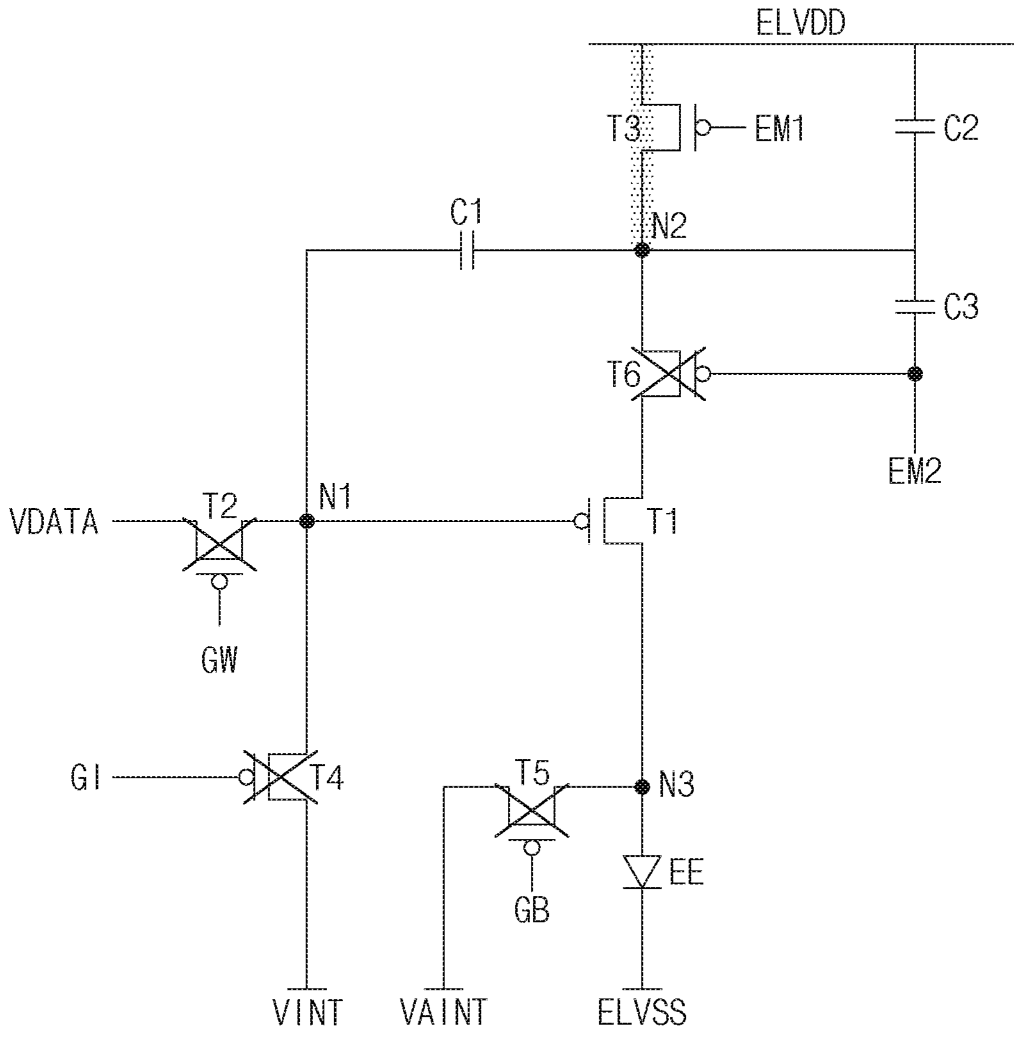
FIG. 8 is a schematic diagram showing one example of driving the pixel circuit of FIG. 4 in a third period.
Figure 9:
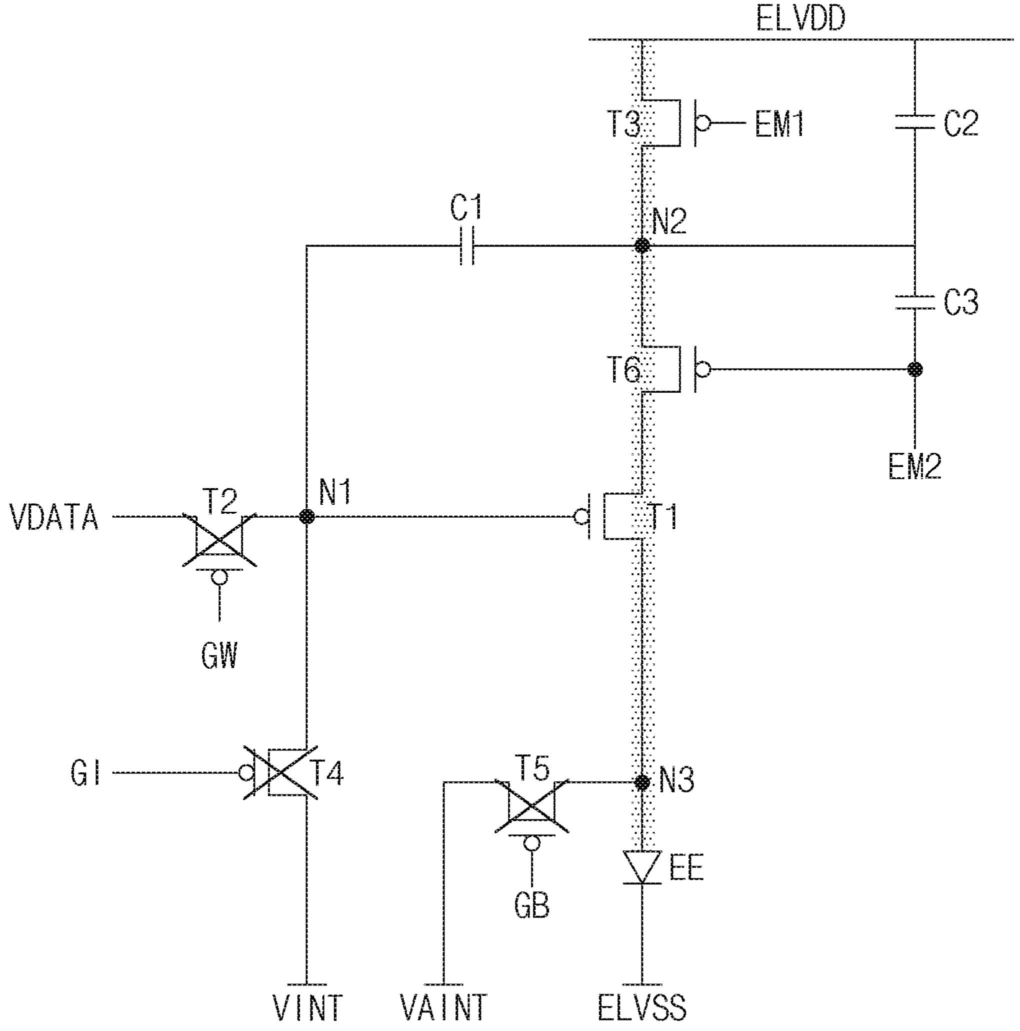
FIG. 9 is a schematic diagram showing one example of driving the pixel circuit of FIG. 4 in a fourth period.

FIG. 5 is a schematic timing diagram showing one example of driving the pixel circuit P" of FIG. 4, FIG. 6 is a schematic diagram showing one example of driving the pixel circuit P" of FIG. 4 in a first period P1, FIG. 7 is a schematic diagram showing one example of driving the pixel circuit P" of FIG. 4 in a second period P2, FIG. 8 is a schematic diagram showing one example of driving the pixel circuit P" of FIG. 4 in a third period P3, and FIG. 9 is a schematic diagram showing one example of driving the pixel circuit P" of FIG. 4 in a fourth period P4.

Referring to FIGS. 5 and 6, in a first period P1, the initialization gate signal GI, the bias gate signal GB, and the second emission signal EM2 may have activation periods, and the write gate signal GW and the first emission signal EM1 may have inactivation periods. Accordingly, the first initialization transistor T4, the second initialization transistor T5, and the second emission transistor T6 may be turned on, the first initialization voltage VINT may be applied to the first node N1, and the second initialization voltage VAINT may be applied to the third node N3. Therefore, a voltage of the first node N1 may be VINT, and a voltage of the second node N2 may be VAINT−VTH, where VINT may be the first initialization voltage, VAINT may be the second initialization voltage, and VTH may be a threshold voltage of the driving transistor T1.

Referring to FIGS. 5 and 7, in a second period P2 following the first period P1, the write gate signal GW may have an activation period, and the initialization gate signal GI, the bias gate signal GB, the first emission signal EM1, and the second emission signal EM2 may have inactivation periods. Accordingly, the write transistor T2 may be turned on, and the data voltage VDATA may be applied to the first node N1. In addition, the voltage of the second node N2 may be increased by (C_C1/(C_C1+C_C2+C_C3))*(VDATA−VINT) according to coupling of the first capacitor C1, and may be increased by (C_C3/(C_C1+C_C2+C_C3))*(VH−VL) according to coupling of the third capacitor C3. Therefore, the voltage of the first node N1 may be VDATA, the voltage of the second node N2 may be VAINT−VTH+(C_C1/(C_C1+C_C2+C_C3))*(VDATA−VINT)+(C_C3/(C_C1+C_C2+C_C3))*(VH−VL), where VDATA may be the data voltage, VAINT may be the second initialization voltage, VTH may be the threshold voltage of the driving transistor T1, C_C1 may be a capacitance of the first capacitor C1, C_C2 may be a capacitance of the second capacitor C2, C_C3 may be a capacitance of the third capacitor C3, VH may be a high voltage level, and VL may be a low voltage level.

Referring to FIGS. 5 and 8, in a third period P3 following the second period P2, the first emission signal EM1 may have an activation period, and the initialization gate signal GI, the bias gate signal GB, the write gate signal GW, and the second emission signal EM2 may have inactivation periods. Accordingly, the first emission transistor T3 may be turned on, and the first power supply voltage ELVDD may be applied to the second node N2. In addition, the voltage of the first node N1 may be increased by ELVDD−(VAINT−VTH+(C_C1/(C_C1+C_C2+C_C3))*(VDATA−VINT)+(C_C3/(C_C1+C_C2+C_C3))) according to the coupling of the first capacitor C1. ELVDD−(VAINT−VTH+(C_C1/(C_C1+C_C2+C_C3))*(VDATA−VINT)+(C_C3/(C_C1+C_C2+C_C3))). Therefore, the voltage of the first node N1 may be VDATA+ELVDD−(VAINT−VTH+(C_C1/(C_C1+C_C2+C_C3))*(VDATA−VINT)+(C_C3/(C_C1+C_C2+C_C3))), and the voltage of the second node N2 may be ELVDD, where VDATA may be the data voltage, ELVDD may be the first power supply voltage, VAINT may be the second initialization voltage, VTH may be the threshold voltage of the driving transistor T1, C_C1 may be the capacitance of the first capacitor C1, C_C2 may be the capacitance of the second capacitor C2, C_C3 may be the capacitance of the third capacitor C3, VH may be the high voltage level, and VL may be the low voltage level.

Referring to FIGS. 5 and 9, in a fourth period P4 following the third period P3, the driving transistor T1 may generate the driving current corresponding to a gate-source voltage, and the gate-source voltage may be ELVDD−(VAINT−VTH+(C_C1/(C_C1+C_C2+C_C3))*(VDATA−VINT)+(C_C3/(C_C1+C_C2+C_C3))). Since the gate-source voltage of the driving transistor T1 includes a data voltage component and a threshold voltage component, the driving current may include the data voltage component without including the threshold voltage component. In other words, the threshold voltage of the driving transistor T1 may be compensated for.

Figure 10:
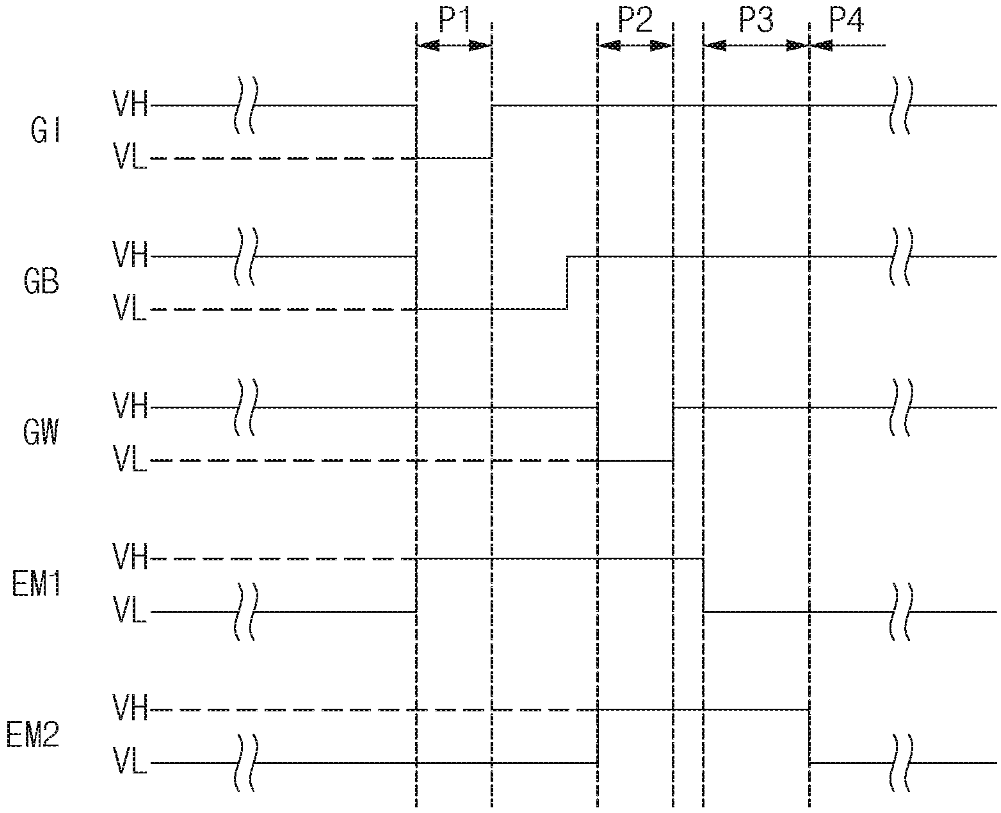
FIG. 10 is a schematic timing diagram showing one example of driving a pixel circuit according to embodiments of the disclosure.

FIG. 10 is a schematic timing diagram showing one example of driving a pixel circuit P according to embodiments of the disclosure.

Since a pixel circuit P according to the embodiments has a configuration that may be substantially identical to the configuration of the pixel circuit P' of FIG. 4 except for the bias gate signal GB, the same reference numbers and reference signs will be used for the same or similar components, and redundant descriptions will be omitted.

Referring to FIG. 10, a length of the activation period of the bias gate signal GB may be longer than a length of the activation period of the initialization gate signal GI. In order to ensure a time for a voltage corresponding to the second initialization voltage VAINT to be charged in all of the first to third capacitors C1, C2, and C3, the length of the activation period of the bias gate signal GB may be increased.

Figure 11:
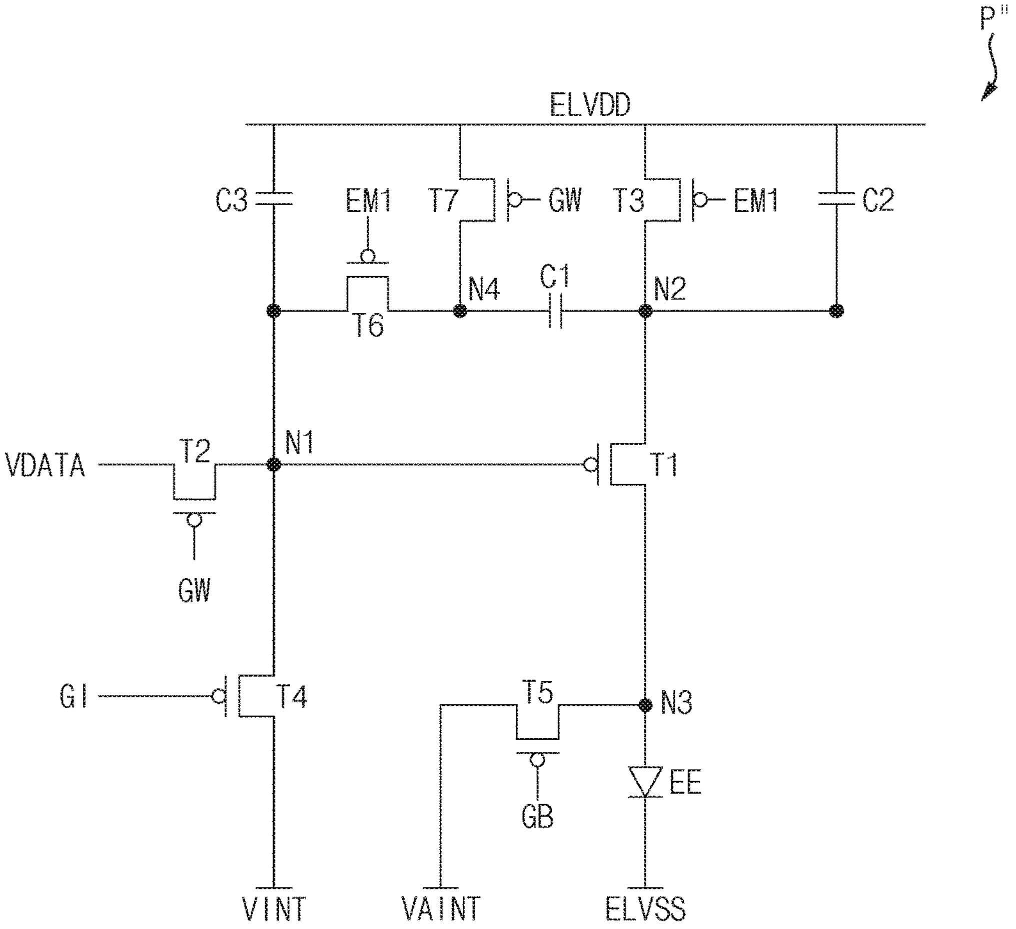
FIG. 11 is a schematic diagram of an equivalent circuit of a pixel according to embodiments of the disclosure.

FIG. 11 is a schematic diagram of an equivalent circuit showing a pixel P" according to embodiments of the disclosure.

Referring to FIG. 11, a pixel circuit P" may include a driving transistor T1 configured to generate a driving current; a first capacitor C1 including a first electrode electrically connected to fourth node N4, and the first capacitor C1 also including a second electrode electrically connected to a first electrode of the driving transistor T1; a write transistor T2 configured to write a data voltage VDATA to the control electrode of the driving transistor T1 in response to a write gate signal GW; a first emission transistor T3 configured to provide a first power supply voltage ELVDD to the second electrode of the first capacitor C1 in response to a first emission signal EM1; a first initialization transistor T4 configured to provide a first initialization voltage VINT to the control electrode of the driving transistor T1 and the first node N1 in response to an initialization gate signal GI; a second initialization transistor T5 configured to provide a second initialization voltage VAINT to a second electrode of the driving transistor T1 in response to a bias gate signal GB; and a light emitting element EE configured to receive the driving current to emit light. According to one embodiment, the pixel circuit P" may further include a second capacitor C2 including a first electrode configured to receive the first power supply voltage ELVDD, and a second electrode electrically connected to the second electrode of the first capacitor C1.

According to one embodiment, the pixel circuit P" may include the second emission transistor T6 configured to electrically connect the control electrode of the driving transistor T1 to the first electrode of the first capacitor C1 in response to the first emission signal EM1. According to one embodiment, the pixel circuit P" may further include a third capacitor C3 including a first electrode configured to receive the first power supply voltage ELVDD, and a second electrode connected to the control electrode of the driving transistor T1. According to one embodiment, the pixel circuit P" may include a compensation reference transistor T7 configured to provide the first power supply voltage ELVDD to the first electrode of the first capacitor C1 in response to the write gate signal GW.

For example, the driving transistor T1 may include a control electrode connected to the first node N1, a first electrode connected to the second node N2, and a second electrode connected to the third node N3. The write transistor T2 may include a control electrode configured to receive the write gate signal GW, a first electrode configured to receive the data voltage VDATA, and a second electrode connected to the first node N1. The first emission transistor T3 may include a control electrode configured to receive the first emission signal EM1, a first electrode configured to receive the first power supply voltage ELVDD, and a second electrode connected to the second node N2. The first initialization transistor T4 may include a control electrode configured to receive the initialization gate signal GI, a first electrode configured to receive the first initialization voltage VINT, and a second electrode connected to the first node N1. The second initialization transistor T5 may include a control electrode configured to receive the bias gate signal GB, a first electrode configured to receive the second initialization voltage VAINT, and a second electrode connected to the third node N3. The first capacitor C1 may include a first electrode connected to a fourth node N4, and a second electrode connected to the second node N2. The second capacitor C2 may include a first electrode configured to receive the first power supply voltage ELVDD, and a second electrode connected to the second node N2. The light emitting element EE may include a first electrode connected to the third node N3, and a second electrode configured to receive a second power supply voltage ELVSS. The second emission transistor T6 may include a control electrode configured to receive the first emission signal EM1, a first electrode connected to the first node N1, and a second electrode connected to the fourth node N4. The third capacitor C3 may include a first electrode configured to receive the first power supply voltage ELVDD, and a second electrode connected to the control electrode of the driving transistor T1. The compensation reference transistor T7 may include a control electrode configured to receive the write gate signal GW, a first electrode configured to receive the first power supply voltage ELVDD, and a second electrode connected to the fourth node N4.

According to one embodiment, the first initialization voltage VINT may be equal to the second initialization voltage VAINT. According to one embodiment, the second initialization voltage VAINT may be equal to the second power supply voltage ELVSS.

The driving transistor T1, the write transistor T2, the first emission transistor T3, the first initialization transistor T4, the second initialization transistor T5, the second emission transistor T6, and the compensation reference transistor T7 may be implemented as PMOS transistors. A low voltage level may be an activation level, and a high voltage level may be an inactivation level. For example, in case that a signal applied to a control electrode of the PMOS transistor has the low voltage level, the PMOS transistor may be turned on. For example, in case that the signal applied to the control electrode of the PMOS transistor has the high voltage level, the PMOS transistor may be turned off.

However, the disclosure may not be limited thereto. For example, the driving transistor T1, the write transistor T2, the first emission transistor T3, the first initialization transistor T4, the second initialization transistor T5, the second emission transistor T6, and the compensation reference transistor T7 may be implemented as NMOS transistors.

Figure 12:
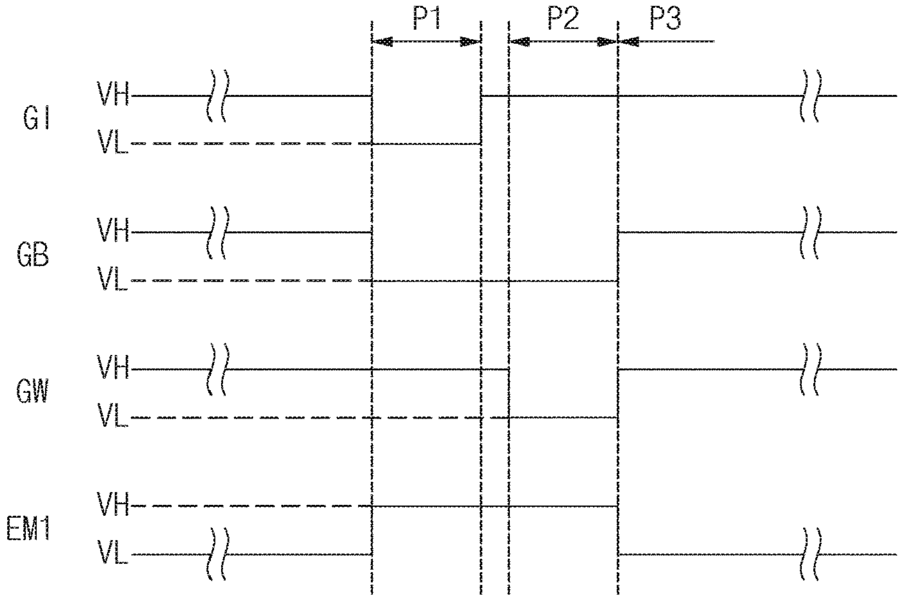
FIG. 12 is a schematic timing diagram showing one example of driving the pixel circuit of FIG. 11.
Figure 13:
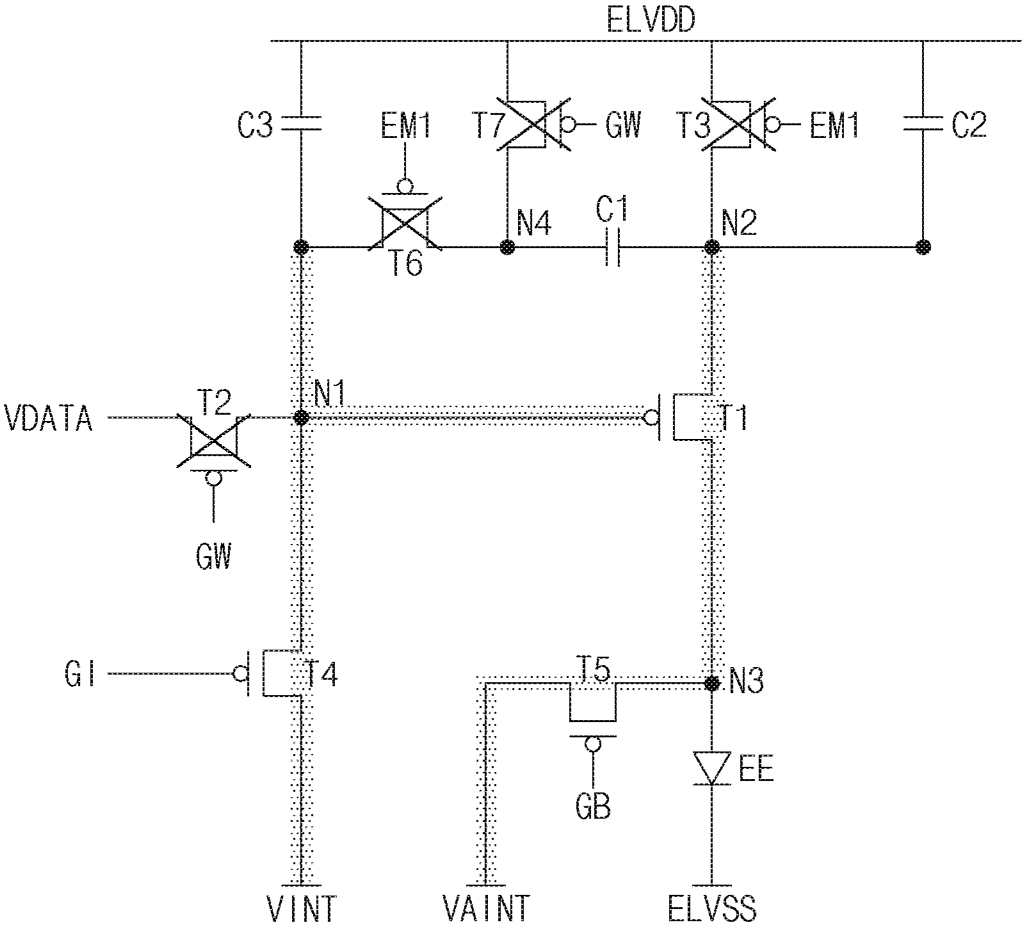
FIG. 13 is a schematic diagram showing one example of driving the pixel circuit of FIG. 11 in a first period.
Figure 14:
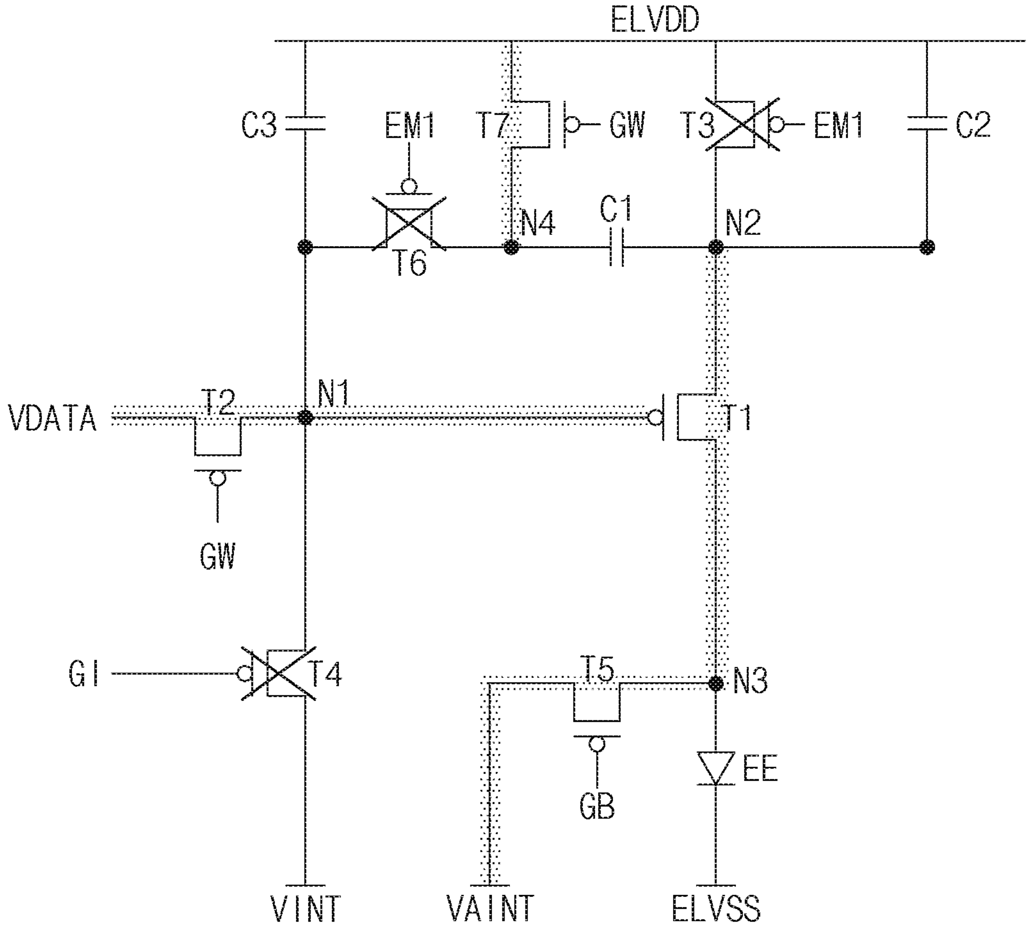
FIG. 14 is a schematic diagram showing one example of driving the pixel circuit of FIG. 11 in a second period.
Figure 15:
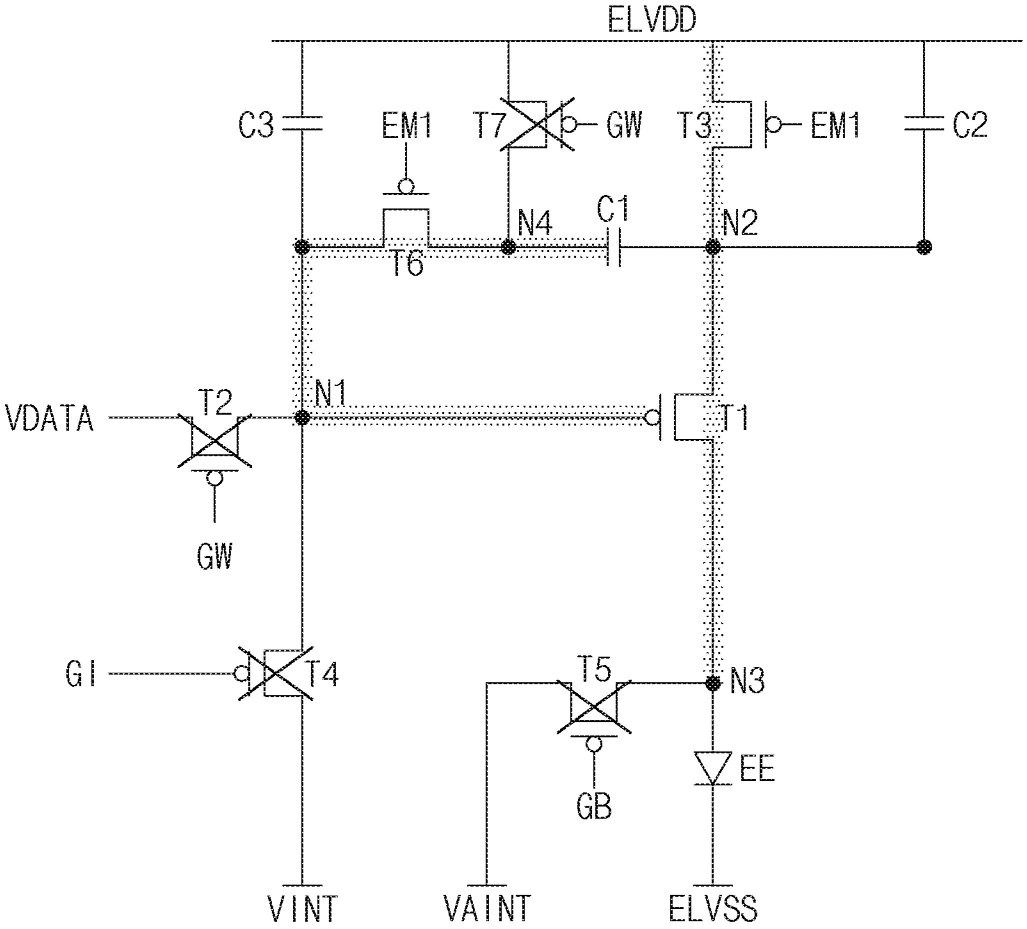
FIG. 15 is a schematic diagram showing one example of driving the pixel circuit of FIG. 11 in a third period.

FIG. 12 is a schematic timing diagram showing one example of driving the pixel circuit P" of FIG. 11, FIG. 13 is a schematic diagram showing one example of driving the pixel circuit P" of FIG. 11 in a first period P1, FIG. 14 is a schematic diagram showing one example of driving the pixel circuit P" of FIG. 11 in a second period P2, and FIG. 15 is a schematic diagram showing one example of driving the pixel circuit P" of FIG. 11 in a third period P3.

Referring to FIGS. 12 and 13, in a first period P1, the initialization gate signal GI and the bias gate signal GB may have activation periods, and the write gate signal GW and the first emission signal EM1 may have inactivation periods. Accordingly, the first initialization transistor T4 and the second initialization transistor T5 may be turned on, the first initialization voltage VINT may be applied to the first node N1, and the second initialization voltage VAINT may be applied to the third node N3. Therefore, a voltage of the first node N1 may be VINT, and a voltage of the second node N2 may be VAINT−VTH, where VINT may be the first initialization voltage, VAINT may be the second initialization voltage, and VTH may be a threshold voltage of the driving transistor T1.

Referring to FIGS. 12 and 14, in a second period P2 following the first period P1, the bias gate signal GB and the write gate signal GW may have activation periods, and the initialization gate signal GI and the first emission signal EM1 may have inactivation periods. Accordingly, the write transistor T2, the second initialization transistor T5, and the compensation reference transistor T7 may be turned on, the data voltage VDATA may be applied to the first node N1, the second initialization voltage VAINT may be applied to the third node N3, and the first power supply voltage ELVDD may be applied to the fourth node N4. In addition, the voltage of the first node N1 may be VDATA, and the voltage of the second node N2 may be VDATA−VTH due to a current path formed through the driving transistor T1, where VDATA may be the data voltage, VTH may be the threshold voltage of the driving transistor T1, and ELVDD may be the first power supply voltage.

Referring to FIGS. 12 and 15, in a third period P3 following the second period P2, the first emission signal EM1 may have an activation period, and the initialization gate signal GI, the bias gate signal GB, and the write gate signal GW may have inactivation periods. Accordingly, the first emission transistor T3 and the second emission transistor T6 may be turned on.

In the second period P2, a charge amount of the first capacitor C1 may be C_C1*(ELVDD−(VDATA−VTH)), and a charge amount of the third capacitor C3 may be C_C3*(VDATA−ELVDD). In addition, in case that coupling of the first capacitor C1 is not considered, in the third period P3, the charge amount of the first capacitor C1 may be C_C1*(V_N1−ELVDD), and the charge amount of the third capacitor C3 may be C_C2*(V_N1−ELVDD). In addition, since a sum of the charge amounts of the first and third capacitors C1 and C3 in the second period P2 may be equal to a sum of the charge amounts of the first and third capacitors C1 and C3 in the third period P3 before considering the coupling of the first capacitor C1, V_N1 may be (2*C_C1*ELVDD+(C_C3−C_C1)*VDATA+C_C1*VTH)/(C_C1+C_C3). In addition, the voltage of the first node N1 may be increased by (C_C1/(C_C1+C_C3))*(ELVDD−(VDATA−VTH)) according to the coupling of the first capacitor C1. Therefore, the voltage of the first node N1 may be (2*C_C1*ELVDD+(C_C3−C_C1)*VDATA+C_C1*VTH)/(C_C1+C_C3)+(C_C1/(C_C1+C_C3))*(ELVDD−(VDATA−VTH)), and the voltage of the second node N2 may be ELVDD. In summary, the voltage of the first node N1 may be ((3*C_C1)/(C_C1+C_C3))*ELVDD+((C_C3−2*C_C1)/(C1+C2))*VDATA+((2*C_C1)/(C_C1+C_C3))*VTH, where V_N1 may be the voltage of the first node N1 before considering the coupling of the first capacitor C1 in the third period P3, C_C1 may be a capacitance of the first capacitor C1, C_C3 may be a capacitance of the third capacitor C3, ELVDD may be the first power supply voltage, and VTH may be the threshold voltage of the driving transistor T1.

In the third period P3 where the light emitting element EE emits the light, the driving transistor T1 may generate the driving current corresponding to a gate-source voltage, and the gate-source voltage may be ((3*C_C1)/(C_C1+C_C3)−1)*ELVDD+((C_C3−2*C_C1)/(C1+C2))*VDATA+((2*C_C1)/(C_C1+C_C3))*VTH. Since the gate-source voltage of the driving transistor T1 includes a data voltage component and a threshold voltage component, the driving current may include the data voltage component and the threshold voltage component having a value smaller than the threshold voltage. In other words, a part of the threshold voltage of the driving transistor T1 may be compensated for.

Figure 16:
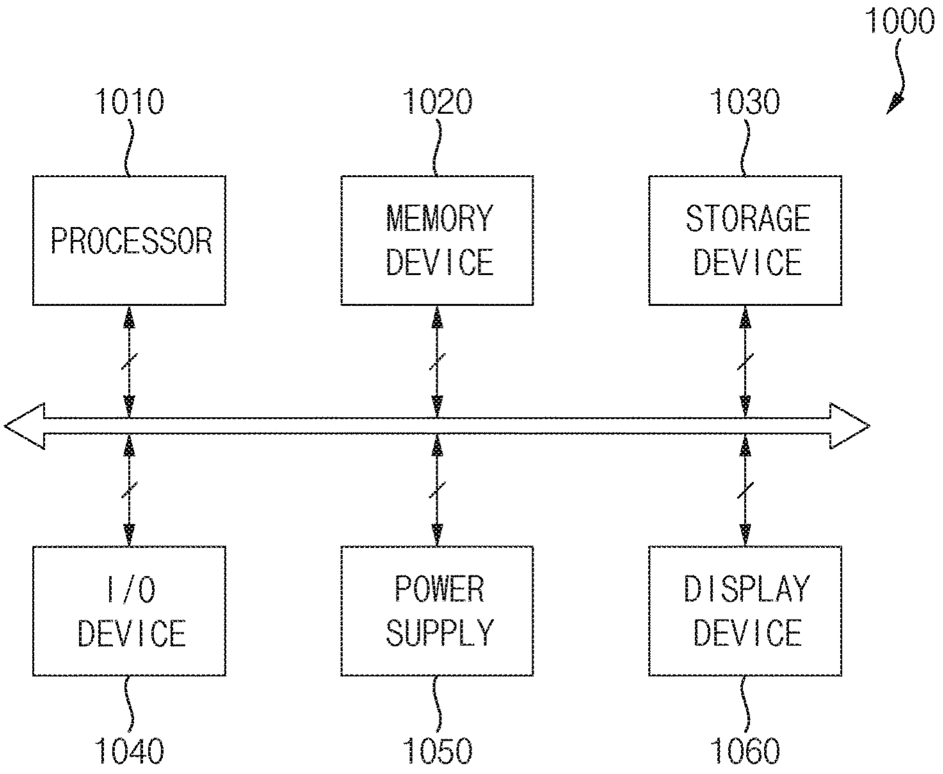
FIG. 16 is a schematic block diagram showing an electronic device according to embodiments of the disclosure.
Figure 17:
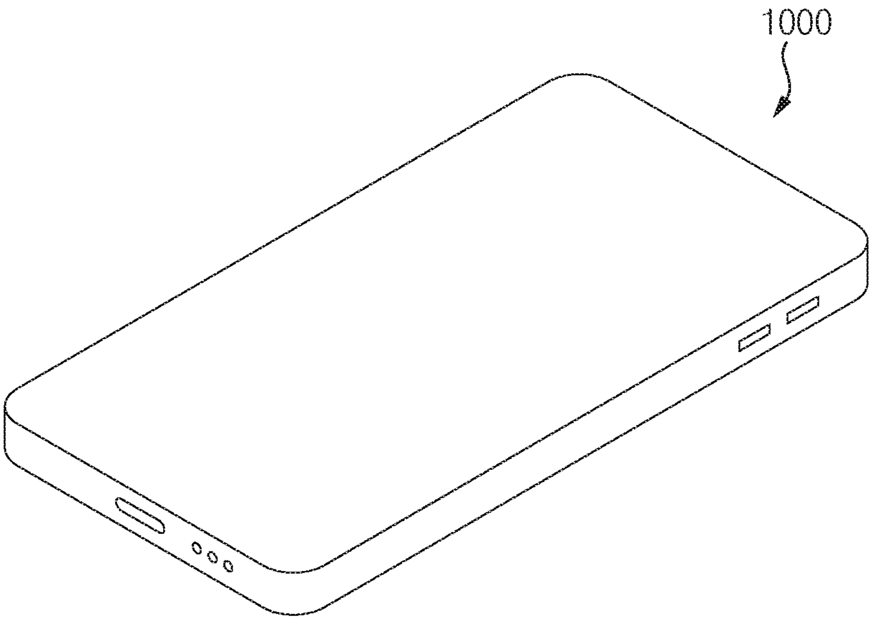
FIG. 17 is a schematic diagram showing one example in which the electronic device of FIG. 16 is implemented as a smart phone.

FIG. 16 is a schematic block diagram showing an electronic device 1000 according to embodiments of the disclosure, and FIG. 17 is a schematic diagram showing one example in which the electronic device 1000 of FIG. 16 may be implemented as a smart phone.

Referring to FIGS. 16 and 17, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include multiple ports for communicating with a video card, a sound card, a memory card, a universal serial bus (USB) device, other electronic devices, etc. In an embodiment, as shown in FIG. 17, the electronic device 1000 may be implemented as a smart phone. However, the electronic device 1000 may not be limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In some embodiments, the display device 1060 may be an organic light emitting display device or a quantum dot light emitting display device, but may not be limited thereto. The display device 1060 may be connected to other components through the buses or other communication links.

The disclosure may be applied to a display device and an electronic device including the display device. For example, the disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing may be illustrative of embodiments and may not be to be construed as limiting thereof. Although a few embodiments have been described, those skilled in the art will readily appreciate that many modifications may be possible in the embodiments without materially departing from the novel teachings and advantages of the disclosure. Accordingly, all such modifications may be intended to be included within the scope of the disclosure as defined in the claims. Therefore, it may be to be understood that the foregoing may be illustrative of various embodiments and may not be to be construed as limited to the specific embodiments disclosed, and that modifications to the disclosed embodiments, as well as other embodiments, may be intended to be included within the scope of the appended claims.

What is claimed is:

1. A pixel circuit comprising:

a driving transistor configured to transmit a driving current;

a first capacitor including a first electrode and a second electrode;

a write transistor configured to write a data voltage to a control electrode of the driving transistor in response to a write gate signal;

a first emission transistor configured to provide a first power supply voltage to the second electrode of the first capacitor in response to a first emission signal;

a first initialization transistor configured to provide a first initialization voltage to the control electrode of the driving transistor in response to an initialization gate signal;

a second initialization transistor configured to provide a second initialization voltage to a second electrode of the driving transistor in response to a bias gate signal;

a light emitting element that receives the driving current to emit light;

a second emission transistor configured to electrically connect the first electrode of the driving transistor to the second electrode of the first capacitor in response to a second emission signal; and a third capacitor including a first electrode that receives the second emission signal and a second electrode electrically connected to the second electrode of the first capacitor, wherein the first electrode of the first capacitor is electrically connected to the control electrode of the driving transistor.

2. The pixel circuit of claim 1, further comprising:

a second capacitor including a first electrode that receives the first power supply voltage and a second electrode electrically connected to the second electrode of the first capacitor, wherein the first electrode of the first capacitor is electrically connected to the control electrode of the driving transistor.

3. The pixel circuit of claim 1, wherein the initialization gate signal and the bias gate signal have activation periods in a first period, the write gate signal has an activation period in a second period following the first period, and the first emission signal has an activation period in a third period following the second period.

4. The pixel circuit of claim 1, wherein the initialization gate signal, the bias gate signal, and the second emission signal have activation periods in a first period, the write gate signal has an activation period in a second period following the first period, the first emission signal has an activation period in a third period following the second period, and the first emission signal and the second emission signal have activation periods in a fourth period following the third period.

5. A pixel circuit comprising:

a driving transistor configured to transmit a driving current;

a first capacitor including a first electrode and a second electrode;

a write transistor configured to write a data voltage to a control electrode of the driving transistor in response to a write gate signal;

a first emission transistor configured to provide a first power supply voltage to the second electrode of the first capacitor in response to a first emission signal;

a first initialization transistor configured to provide a first initialization voltage to the control electrode of the driving transistor in response to an initialization gate signal;

a second initialization transistor configured to provide a second initialization voltage to a second electrode of the driving transistor in response to a bias gate signal;

a light emitting element that receives the driving current to emit light;

a second emission transistor configured to electrically connect the control electrode of the driving transistor to the first electrode of the first capacitor in response to the first emission signal; and a third capacitor including a first electrode that receives the first power supply voltage and a second electrode connected to the control electrode of the driving transistor.

6. The pixel circuit of claim 5, further comprising:

a compensation reference transistor configured to provide the first power supply voltage to the first electrode of the first capacitor in response to the write gate signal.

7. The pixel circuit of claim 6, wherein the initialization gate signal and the bias gate signal have activation periods in a first period, the bias gate signal and the write gate signal have activation periods in a second period following the first period, and the first emission signal has an activation period in a third period following the second period.

8. The pixel circuit of claim 1, wherein the first initialization voltage is equal to the second initialization voltage.

9. A display device comprising:

a display panel including a pixel circuit;

a gate driver configured to provide a write gate signal, an initialization gate signal, and a bias gate signal to the pixel circuit;

an emission driver configured to provide a first emission signal to the pixel circuit;

a data driver configured to provide a data voltage to the pixel circuit; and a timing controller configured to control the gate driver, the emission driver, and the data driver, wherein the pixel circuit includes:

a driving transistor configured to transmit a driving current;

a first capacitor including a first electrode and a second electrode;

a write transistor configured to write the data voltage to a control electrode of the driving transistor in response to the write gate signal;

a first emission transistor configured to provide a first power supply voltage to the second electrode of the first capacitor in response to the first emission signal;

a first initialization transistor configured to provide a first initialization voltage to the control electrode of the driving transistor in response to the initialization gate signal;

a second initialization transistor configured to provide a second initialization voltage to a second electrode of the driving transistor in response to the bias gate signal; and a light emitting element that receives the driving current to emit light, wherein the emission driver is configured to further provide a second emission signal to the pixel circuit, the pixel circuit further includes a second emission transistor configured to electrically connect the first electrode of the driving transistor to the second electrode of the first capacitor in response to the second emission signal and a third capacitor including a first electrode that receives the second emission signal and a second electrode electrically connected to the second electrode of the first capacitor, and the first electrode of the first capacitor is electrically connected to the control electrode of the driving transistor.

10. The display device of claim 9, wherein the pixel circuit further includes:

a second capacitor including a first electrode that receives the first power supply voltage and a second electrode electrically connected to the second electrode of the first capacitor, wherein the first electrode of the first capacitor is electrically connected to the control electrode of the driving transistor.

11. The display device of claim 9, wherein the initialization gate signal and the bias gate signal have activation periods in a first period, the write gate signal has an activation period in a second period following the first period, and the first emission signal has an activation period in a third period following the second period.

12. The display device of claim 9, wherein the initialization gate signal, the bias gate signal, and the second emission signal have activation periods in a first period, the write gate signal has an activation period in a second period following the first period, the first emission signal has an activation period in a third period following the second period, and the first emission signal and the second emission signal have activation periods in a fourth period following the third period.

13. A display device comprising:

a display panel including a pixel circuit;

a gate driver configured to provide a write gate signal, an initialization gate signal, and a bias gate signal to the pixel circuit;

an emission driver configured to provide a first emission signal to the pixel circuit;

a data driver configured to provide a data voltage to the pixel circuit; and a timing controller configured to control the gate driver, the emission driver, and the data driver, wherein the pixel circuit includes:

a driving transistor configured to transmit a driving current;

a first capacitor including a first electrode and a second electrode;

a write transistor configured to write the data voltage to a control electrode of the driving transistor in response to the write gate signal;

a first emission transistor configured to provide a first power supply voltage to the second electrode of the first capacitor in response to the first emission signal;

a first initialization transistor configured to provide a first initialization voltage to the control electrode of the driving transistor in response to the initialization gate signal;

a second initialization transistor configured to provide a second initialization voltage to a second electrode of the driving transistor in response to the bias gate signal; and a light emitting element that receives the driving current to emit light, wherein the pixel circuit further includes a second emission transistor configured to electrically connect the control electrode of the driving transistor to the first electrode of the first capacitor in response to the first emission signal and a third capacitor including a first electrode that receives the first power supply voltage and a second electrode connected to the control electrode of the driving transistor.

14. The display device of claim 13, wherein the pixel circuit further includes:

a compensation reference transistor configured to provide the first power supply voltage to the first electrode of the first capacitor in response to the write gate signal.

* * * * *